No. 659,731. Patented Oct. 16, 1900.
M. J. FLYNN.
BICYCLE HANDLE BAR.
(Application filed June 1, 1900.)

(No Model.)

Witnesses:
Wm. H. Barker.
Arthur B. Jenkins.

Inventor:
Michael J. Flynn.
by Chas. L. Burdett, Attorney.

THE NORRIS PETERS CO., PHOTO-LITHO., WASHINGTON, D. C.

UNITED STATES PATENT OFFICE.

MICHAEL J. FLYNN, OF HARTFORD, CONNECTICUT, ASSIGNOR TO ANN FLYNN, OF SAME PLACE.

BICYCLE HANDLE-BAR.

SPECIFICATION forming part of Letters Patent No. 659,731, dated October 16, 1900.

Application filed June 1, 1900. Serial No. 18,722. (No model.)

*To all whom it may concern:*

Be it known that I, MICHAEL J. FLYNN, a citizen of the United States, and a resident of Hartford, in the county of Hartford and State of Connecticut, have invented certain new and useful Improvements in Bicycle Handle-Bars, of which the following is a description whereby any one skilled in the art can make and use the same.

My invention relates to that class of handle-bars in which each handle-bar may be adjusted so that the grip or handle proper may be located in different positions; and one object of my improvement is to provide a device of this class in which the bars may be moved simultaneously and each bar have the same amount of movement as its companion bar; and a further object is to provide a device of this class that shall be simple in construction and compact as to form. A form of device by means of which these objects may be attained is shown in the accompanying drawings, in which—

Figure 1:
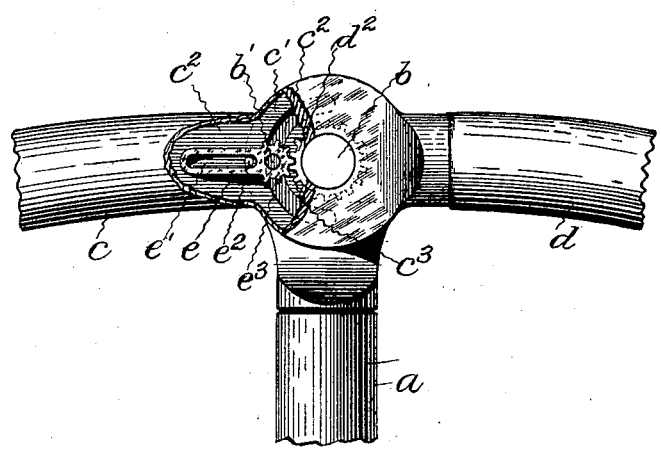
Figure 2:
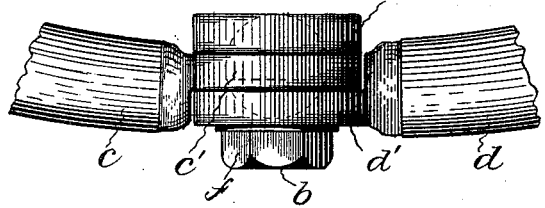
Figure 3:
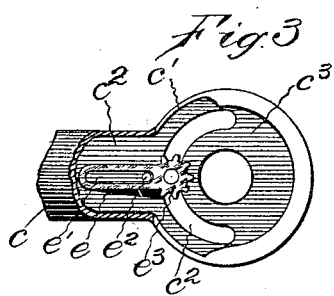
Figure 4:
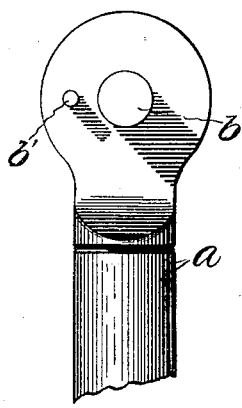
Figure 5:
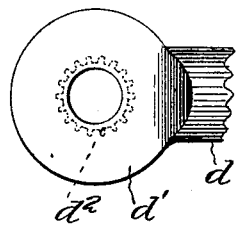

Figure 1 is a view in elevation of a structure embodying my invention, the nut being removed and parts broken away to show construction. Fig. 2 is a top view of the device. Fig. 3 is a detail view of the inner end of one of the handle-bars with parts broken away to show construction. Fig. 4 is a detail view showing the upper end of the standard. Fig. 5 is a detail end view of a handle-bar used in connection with the bar shown in Fig. 3.

My device is illustrated and described herein in connection with the handle-bar of a bicycle or like vehicle as a machine in which it finds ready adaptation; but it is obvious that it is not limited to use in such a machine.

In the accompanying drawings the letter $a$ denotes a standard which is adapted to be clamped in the steering-head of a bicycle in any ordinary manner. This standard is cut away on one side at its upper end, and from the face of this flattened portion a pin $b$ projects at right angles to the axis of the standard. A pin $b'$ also projects from the surface of the flattened portion of the standard $a$ in a direction parallel to the pin $b$.

The handle-bar is formed in two sections $c$ and $d$. The section $c$ is cut away, forming a depressed portion $c'$, and a slot $c^2$ extends completely through the floor of this depressed portion. This slot is formed on the arc of a circle of which the axis of the pin $b$ is the center, and the pin $b'$ is so located with reference to the pin $b$ as to project upward through this slot and beyond the floor of the depressed portion $c'$ in the section $c$ of the handle-bar. A recess $c^2$ is formed in the handle-bar, and in this recess a lever $e$ is located. This lever has a lengthwise slot $e'$, through which a pin $e^2$ extends. The outer end of the lever bears a segmental gear $e^3$, and this end of the lever is pivoted on the pin $b'$. A recess $c^3$ is also formed in the floor of the depressed portion $c'$. The section $d$ of the handle-bar is also cut away, forming a depressed portion $d'$, through which a hole extends for the reception of the pin $b$, which forms a pivot for this section of the handle-bar.

The depressed portions of each handle-bar fit against each other, each forming a socket for the flattened portion of the opposite bar. A gear-wheel $d^2$ is located in the bottom of the depressed portion $d'$ in position to project and be located in the recess $c^3$ in the face of the depressed portion in the section $c$. The teeth of this gear-wheel mesh with the segmental gear $e^3$ on the lever $e$. A nut $f$, secured to the outer threaded end of the pin $b$, holds the several parts of the device in proper position with respect to each other.

When the parts are in proper position, a swinging movement of either of the sections of the handle-bar is communicated to the opposite section through the medium of the gear-wheel $d^2$ and the lever $e$. The pin $b$ forms a pivot on which the sections of the handle-bar turn, and the pin $b'$ a pivot on which the outer end of the lever $e$ turns. The pin $e^2$ forms a fulcrum on which the lever $e$ bears, and the longer arm of the lever engaging the pin $e^2$ causes each handle-bar section to move with and to the same extent as the opposite section.

It is obvious that my invention is not limited to the specific arrangement of parts as herein shown and described and that the arrangement may be modified and yet come within the scope of the invention, and I do not desire to limit myself to the exact construction as herein shown and described.

What I claim as my invention, and desire to secure by Letters Patent, is—

1. A standard, a handle-bar pivotally mounted on the standard, a pivotally-mounted lever connected with said handle-bar and having gear-teeth, a gear-wheel in engagement with said lever, and a second handle-bar pivotally mounted on the standard and operatively connected with said gear-wheel.

2. A standard, a lever having teeth and pivotally mounted on the standard, a handle-bar pivotally mounted on the standard and connected with said lever, a second handle-bar mounted on the standard, and a gear-wheel mounted on said last-mentioned handle-bar and in engagement with the teeth on said lever.

3. A standard, a pair of handle-bars pivotally mounted on the standard, a gear-wheel operatively connected with one of said bars, a lever having a lengthwise slot and pivoted to the standard and having teeth in mesh with said gear-wheel, and a pin projecting from the opposite handle-bar into said slot.

4. A standard, a pair of handle-bars pivotally mounted on the standard, a gear-wheel operatively connected with one of said bars, and a pivotally-mounted lever operatively connected with the opposite handle-bar and having teeth meshing with said gear-wheel, and means for partially revolving the end of the lever about the gear-wheel.

5. A standard, a handle-bar pivoted to the standard, a gear-wheel secured to the handle-bar, a second handle-bar pivotally mounted on the standard, and a lever having a pivot-pin extending through a slot in one part and operated by a pin secured to the opposite part.

6. A standard, a handle-bar pivotally mounted on the standard, a gear connected with said handle-bar having a slot, a pin projecting from the standard through said slot, and a lever mounted on said pin and having teeth in engagement with said gear, and also operatively connected with the last-mentioned handle-bar.

7. A standard, a pin projecting from the standard, a handle-bar mounted on said pin and having a gear-wheel, a second handle-bar mounted on said pin and having a slot, a pin projecting from the standard through said slot, a lever having teeth meshing with the teeth of the gear-wheel and pivotally mounted on said pin, and a pin from the last-mentioned handle-bar projecting through a slot in the lever.

8. A standard having a recessed end, a pair of handle-bars the end of each of which is located in a recess in the opposite handle-bar, both of said ends being located in the recess in the standard, a gear-wheel operatively connected with one of said handle-bars, and a lever connected with the opposite handle-bar and having teeth meshing with said gear-wheel.

MICHAEL J. FLYNN.

Witnesses:
ARTHUR B. JENKINS,
ALBERT G. TATRO.